(12) United States Patent
Al-Amin

(10) Patent No.: US 6,830,264 B2
(45) Date of Patent: Dec. 14, 2004

(54) AIR BAG INFLATOR WITH INITIATOR RETAINER

(75) Inventor: Ahmad K. Al-Amin, Higley, AZ (US)

(73) Assignee: TRW Inc., Lyndhurst, OH (US)

( * ) Notice: Subject to any disclaimer, the term of this patent is extended or adjusted under 35 U.S.C. 154(b) by 8 days.

(21) Appl. No.: 09/925,711

(22) Filed: Aug. 9, 2001

(65) Prior Publication Data

US 2002/0109340 A1 Aug. 15, 2002

Related U.S. Application Data

(63) Continuation-in-part of application No. 09/780,751, filed on Feb. 9, 2001, now abandoned.

(51) Int. Cl.[7] .............................................. B60R 21/26
(52) U.S. Cl. ...................... 280/736; 280/741; 102/531
(58) Field of Search ............................... 280/736, 737, 280/738, 741, 742; 102/530, 531

(56) References Cited

U.S. PATENT DOCUMENTS

| | | | |
|---|---|---|---|
| 5,056,815 A | * 10/1991 | Geisreiter | 280/736 |
| 5,351,988 A | 10/1994 | Bishop et al. | |
| 5,590,906 A | 1/1997 | Faigle et al. | |
| 5,609,362 A | 3/1997 | Sparks et al. | |
| 5,669,631 A | 9/1997 | Johnson et al. | |
| 5,794,973 A | * 8/1998 | O'Loughlin et al. | 280/737 |
| 5,803,493 A | * 9/1998 | Paxton et al. | 280/737 |
| 5,839,754 A | 11/1998 | Schluter et al. | |
| 5,913,537 A | * 6/1999 | Goetz | 280/741 |
| 6,010,152 A | * 1/2000 | Swann et al. | 280/736 |
| 6,029,995 A | * 2/2000 | Fink | 280/737 |
| 6,120,058 A | 9/2000 | Mangum et al. | |
| 6,206,420 B1 | 3/2001 | Skanborg et al. | |
| 6,217,065 B1 | * 4/2001 | Al-Amin et al. | 280/737 |
| 6,237,940 B1 | 5/2001 | Shirk et al. | |
| 6,295,935 B1 | 10/2001 | Swann et al. | |
| 6,382,668 B1 | 5/2002 | Goetz | |
| 6,386,581 B1 | * 5/2002 | Ohno | 280/735 |
| 6,412,811 B1 | 7/2002 | Campbell et al. | |

OTHER PUBLICATIONS

Co-pending U.S. Appl. No. 09/515,481, filed Aug. 10, 1999 entitled "Inflator".

* cited by examiner

Primary Examiner—Christopher P. Ellis
Assistant Examiner—Christopher Bottorff
(74) Attorney, Agent, or Firm—Tarolli, Sundheim, Covell & Tummino L.L.P.

(57) ABSTRACT

An inflator (10) comprises a container (30) in which inflation fluid is stored under pressure. The container (30) has an opening (40) through which inflation fluid flows in a given direction from the container. A rupturable closure member (60) is fixed to the container (30) and blocks flow of inflation fluid through the opening (40). The inflator includes an initiator (70) for, when actuated, rupturing the closure member (60) to enable inflation fluid to flow from the container through the opening (40). The inflator (10) also includes a retainer (90) for retaining the initiator (70) on the container (30). The retainer (90) comprises at least one part (94) having a passage (140) for directing gas that flows from the container (30) in the given direction. The inflator (10) also includes a support (150) for the rupturable closure member (60). The support (150) transmits force from the closure member (60) to said retainer (90).

16 Claims, 7 Drawing Sheets

AIR BAG INFLATOR WITH INITIATOR RETAINER

RELATED APPLICATION

This application is a continuation-in-part of U.S. patent application Ser. No. 09/780,751, filed Feb. 9, 2001, entitled Air Bag Inflator With Initiator Retainer, by the same inventor now abandoned.

BACKGROUND OF THE INVENTION

1. Field of the Invention

The present invention relates to an inflator that provides inflation fluid to inflate an inflatable vehicle occupant protection device and, more specifically, to an initiator retainer for an air bag inflator.

2. Description of Related Art

An inflatable vehicle occupant protection device, such as an air bag, is inflated upon the occurrence of a vehicle condition requiring inflation of the air bag. When inflation is required, an inflator is actuated to provide inflation fluid, which inflates the air bag into the vehicle occupant compartment.

The inflator includes a container defining an inflation fluid pressure chamber with an outlet passage. A rupturable closure member is fixed to the container to block flow of inflation fluid through the outlet passage. The inflator further includes an electrically actuatable initiator which, when actuated, causes the closure member to rupture so that inflation fluid in the pressure chamber can flow from the inflator. In some applications, it is desirable that the inflation fluid exit the inflator in a direction parallel to a longitudinal axis of the inflator.

SUMMARY OF THE INVENTION

The present invention is an inflator for inflating an inflatable vehicle occupant protection device. The inflator comprises a container in which inflation fluid is stored under pressure. The container has an opening through which inflation fluid flows in a given direction from the container. A rupturable closure member is fixed to the container and blocks flow of inflation fluid through the opening. The inflator includes an initiator for, when actuated, rupturing the closure member to enable inflation fluid to flow from the container through the opening. The inflator also includes a retainer for retaining the initiator on the container. The retainer comprises at least one part having a passage for directing gas that flows from the container in the given direction. The inflator still further includes a support for the rupturable closure member. The rupturable closure member has a first portion that is deformed into engagement with the support by the pressure of the inflation fluid in the container. The support transmitting force from the closure member to the retainer.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
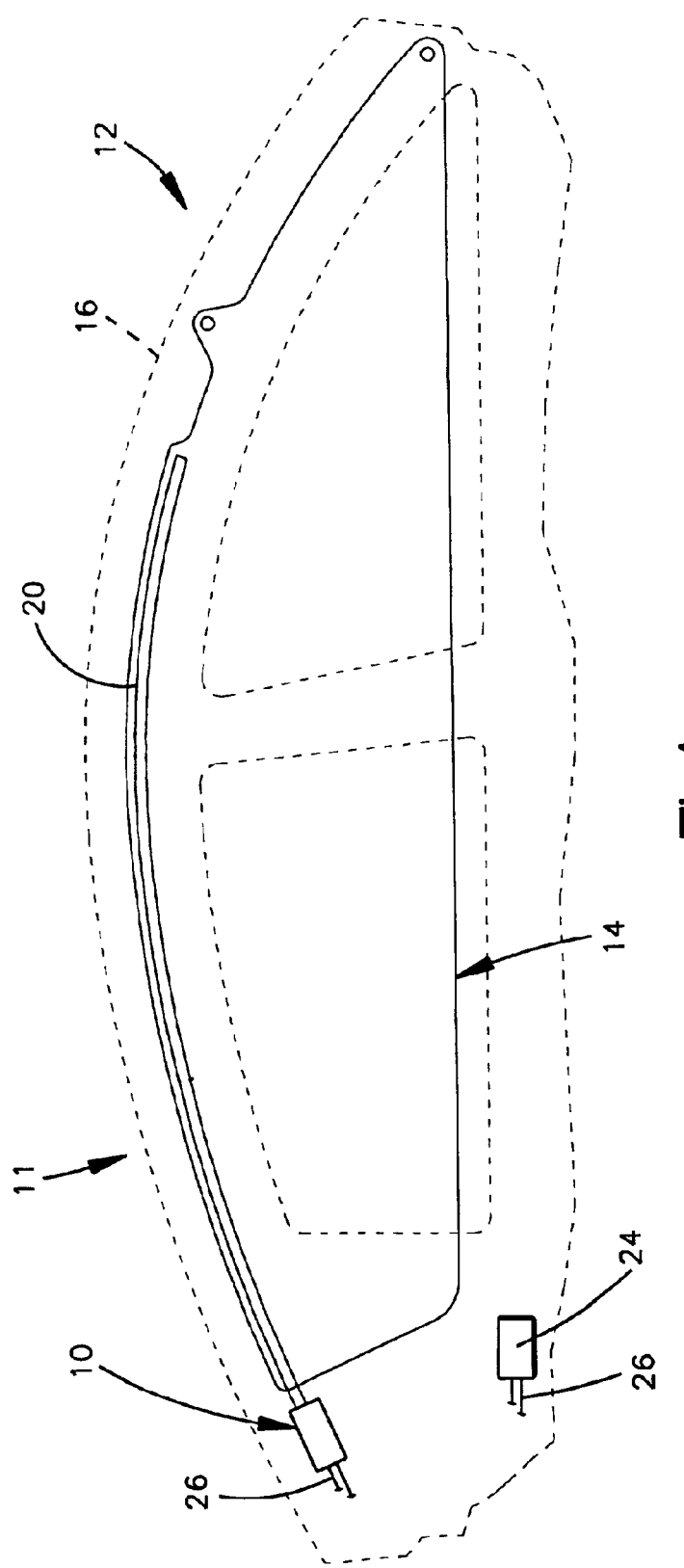
FIG. 1 is a schematic illustration of a vehicle occupant protection apparatus embodying the present invention.

The present invention relates to a vehicle occupant protection apparatus. In particular, the present invention relates to an inflator for an inflatable vehicle occupant protection device. As representative of the present invention, FIG. 1 illustrates an inflator 10 that forms part of a vehicle protection apparatus 11 for helping to protect an occupant of a vehicle 12.

The protection apparatus 11 includes an inflatable vehicle occupant protection device in the form of a side curtain 14. The side curtain 14 is mounted adjacent the side structure 16 of the vehicle 12. A fill tube 20 extends into the side curtain 14. The inflator 10, when actuated, directs fluid into the fill tube 20 which, in turn, directs fluid into the inflatable side curtain 14 to inflate the side curtain. The side curtain 14 is inflated from a deflated and stowed condition (not shown) to an inflated condition, as illustrated in FIG. 1. In its inflated condition, the side curtain 14 is positioned between the side structure 16 of the vehicle 12 and a vehicle occupant. The side curtain 14 is made of a material having a low permeability so that the side curtain remains inflated for a long period of time, such as seven seconds or longer.

The vehicle 12 includes a sensor 24, known in the art, for sensing a side impact to the vehicle and/or a vehicle rollover, to actuate the inflator 10. The sensor 24 may include vehicle electric circuitry for actuating the inflator 10 in response to sensing a side impact to the vehicle and/or a vehicle rollover. The sensor 24 provides an electric signal over lead wires 26 to the inflator 10, when the inflator is to be actuated.

Figure 2:
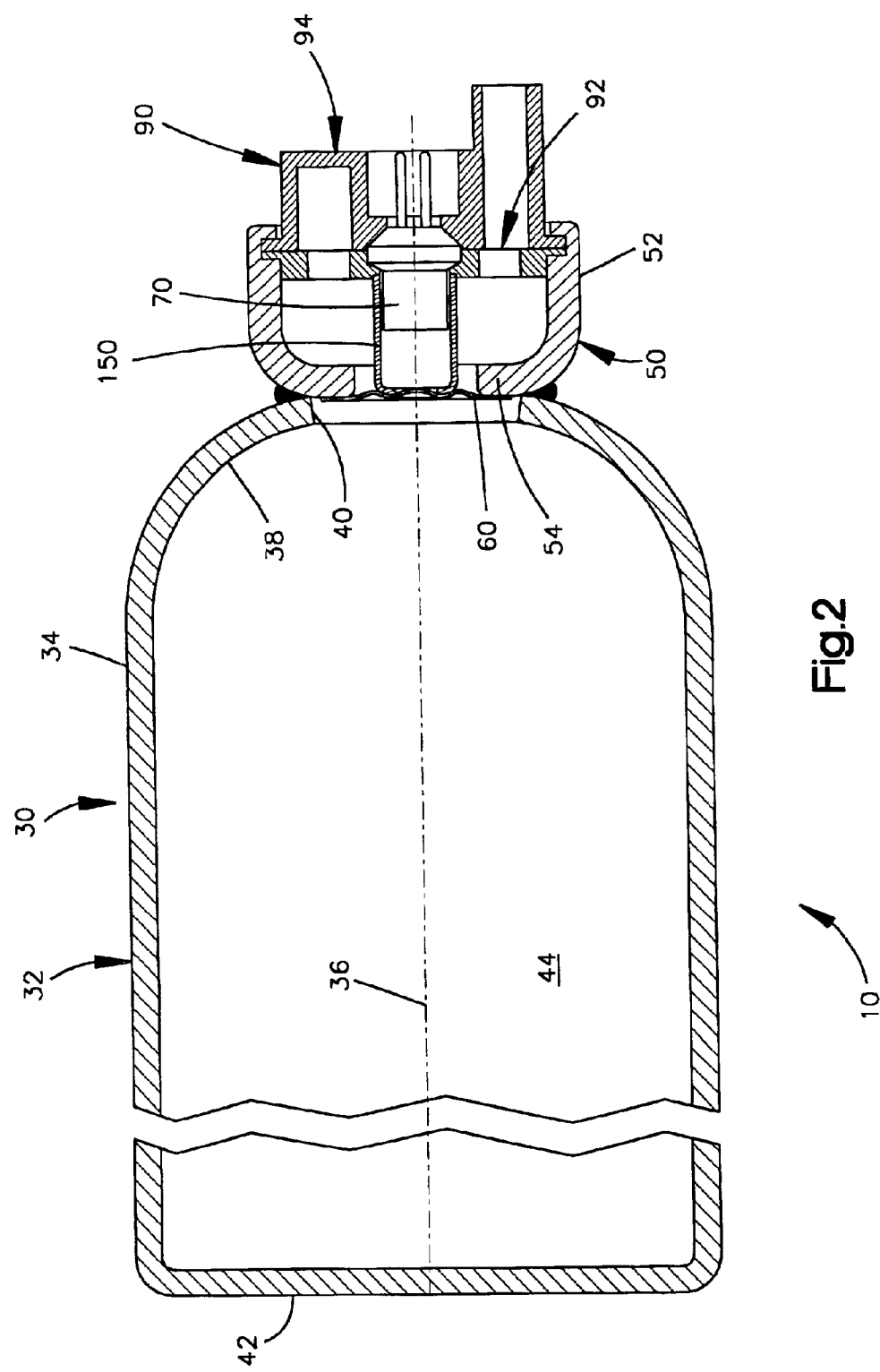
FIG. 2 is an enlarged sectional view of an inflator that forms part of the apparatus of FIG. 1.

The inflator 10 (FIG. 2) comprises a source of inflation fluid for the side curtain 14. The inflator 10 includes a container 30 having a generally elongate configuration including a main body portion 32. The main body portion 32 of the container 30 has a tubular, cylindrical configuration including an axially extending, cylindrical side wall 34. The side wall 34 is centered on a longitudinal central axis 36 of the inflator 10.

A first end wall 38 of the main body portion 32 has an opening 40. The first end wall 38, an opposite second end wall 42, and the side wall 34 define a chamber 44 in the container 30.

An end cap 50 is affixed to the first end wall 38 of the main body portion 32, at a location extending across the opening 40. The end cap 50 is connected to the main body portion 32 in any suitable manner known in the art, such as by friction welding, laser welding, brazing or screw threads. The end cap 50 (FIGS. 2 and 3) has a generally cup-shaped configuration including an axially extending, cylindrical side wall 52 and an annular end wall 54.

A rupturable closure member 60, such as a rupture disk, is affixed to the end wall 54 of the end cap 50 by a laser weld. The rupture disk 60 could, however, be connected to the end cap 50 in any manner well known in the art, such as by brazing, projection welding or electron beam welding. The rupture disk 60 could also be formed in one piece with the end cap 50. The rupture disk 60 is centered on the axis 36 and blocks fluid flow through the opening 40.

The chamber 44 contains pressurized inflation fluid. The inflation fluid stored in the chamber 44 preferably includes helium at a storage pressure within the range of about 4,000 psi to about 7,000 psi. The inflation fluid may, however, have any other composition and storage pressure suitable for inflating the side curtain 14.

The inflator 10 includes an initiator 70. The initiator 70 is of a known design including a support portion 72 (FIG. 3) and a cylindrical main body portion 74 that projects from the support portion. The main body portion 74 and the support portion 72 of the initiator 70 are covered in a deformable material 76, such as molded nylon.

The support portion 72 of the initiator 70 has first and second frustoconical surfaces 78 and 80 that extend, in opposite directions along the axis 36, from a cylindrical outer side surface 82 of the support portion. A pair of terminal pins 84 extend from the support portion 72, in a direction away from the main body portion 74 of the initiator 70.

The inflator 10 includes a retainer 90 for retaining the initiator 70 on the container 30. The retainer 90 includes first and second retainer parts 92 and 94. The first and second retainer parts 92 and 94 are separate members that are movable relative to each other when they are not connected with the container 30.

The first retainer part 92, or inner retainer part, is made from metal and has a disc-shaped main body portion 100 including parallel, radially extending inner and outer major side surfaces 102 and 104. A mounting flange 106 extends radially outward from the main body portion 100.

A plurality of fluid outlet openings 108 are formed in the main body portion 100 of the first retainer part 92. The fluid outlet openings 108, two of which are shown in the drawings, are circular in shape and are disposed in a circular array centered on the axis 36. The fluid outlet openings 108 extend axially between the inner and outer major side surfaces 102 and 104.

The first retainer part 92 has a central surface 110 that defines a central opening 112 in the first retainer part. One portion 114 of the central opening 112 is formed as an annular notch, opening into the outer side surface 104, for receiving a portion of the initiator 70, as described below. Another portion 116 of the central opening 112 is formed as an annular notch, opening into the inner side surface 102, for receiving a portion of a support barrel 150, as described below.

The second retainer part 94, or outer retainer part, is made from metal and has a main body portion 120 with a radially extending inner major side surface 121. A mounting flange 122 extends radially outward from the main body portion 120. The mounting flange 122 on the second retainer part 94 is the same diameter as the mounting flange 106 on the first retainer part 92.

The second retainer part 94 includes cylindrical inner and outer walls 124 and 126 that extend parallel to the axis 36. The inner and outer walls 124 and 126 define between them an annular collection chamber 128. The inner wall 124 defines, radially inward of the inner wall, a chamber 130 for receiving a portion of the initiator 70. The inner wall 124 has a frustoconical surface 132 centered on the axis 36.

The second retainer part 94 includes an outlet tube 140. The outlet tube 140 has a cylindrical configuration and projects from the second retainer part 94, at one circumferential location on the second retainer part. The outlet tube 140 extends parallel to the longitudinal central axis 36 of the inflator 10. The outlet tube 140 is in fluid communication with the collection chamber 128, so that fluid flowing into the collection chamber can exit the second retainer part 94 through the outlet tube.

The support barrel 150 is made from metal and has a cylindrical side wall 152 with a first end portion 154. The side wall 152 is capped at its end opposite the first end portion 154 by a radially extending end wall 156. A circular central opening 158 is formed in the end wall 156 of the support barrel 150.

The inflator 10 is assembled by first welding the rupture disk 60 to the end cap 50. The subassembly of the end cap 50 and rupture disk 60 is then welded to the main body portion 32 of the container 30.

The end portion 154 of the side wall 152 of the support barrel 150 is pressed into the notch 116 in the inner side surface 102 of the first retainer part 92. The support barrel 150 is, thereby, positioned on the first retainer part 92 for movement with the first retainer part.

The subassembly of the first retainer part 92 and the support barrel 150 is inserted into the end cap 50 of the inflator 10. The main body portion 100 of the first retainer part 92 has an interference fit with the side wall 52 of the end cap 50. The mounting flange 106 of the first retainer part 92 engages a stop surface 160 on the side wall 52. The end wall 156 of the support barrel 150 is located adjacent the closure member 60.

The initiator 70 is then fitted into the central opening 110 of the first retainer part 92. The initiator 70 is self-centering in the first retainer part 92. The support portion 72 of the initiator 70 is received in the notch 114 in the first retainer part 92. The main body portion 74 of the initiator 70 extends within the support barrel 150.

The second retainer part 94 is then fitted onto the container 30. The frustoconical surface 132 on the second retainer part 94 engages the support portion 72 of the initiator 70. The inner major side surface 121 of the second retainer part 94 engages the outer major side surface 104 of the first retainer part 92. The mounting flanges 106 and 122 of the retainer parts 92 and 94 overlie each other.

A projecting portion 162 of the end wall 52 of the end cap 50 is deformed radially inwardly and crimped onto the mounting flange 122 of the second retainer part 94 to secure the retainer 90, and thereby the initiator 70, on the container 30. Alternatively, the retainer 90 may be welded to the end cap 50 of the container 30.

The initiator 70 is thus clamped between the first retainer part 92 and the second retainer part 94. The metal from which the first and second retainer parts 92 and 94 are made presses into, and deforms, the plastic outer covering of the support portion 72 of the initiator 70. This engagement of the retainer 90 with the initiator 70 creates a fluid-tight seal between the initiator and the retainer.

When the chamber 44 is not filled with inflation fluid, the closure member 60 is a flat disk and is spaced from the end wall 156 of the support barrel 150. During the subsequent loading of the closure member 60 by the pressure of inflation fluid introduced into the chamber 44 through a fill opening (not shown), the closure member is stressed and undergoes plastic deformation into contact with the end wall 156 of the support barrel 150. The closure member 60 deforms into the shape shown in FIG. 3.

The force of the inflation fluid in the chamber 44, acting on the closure member 60, presses the support barrel 150 firmly into engagement with the first retainer part 92. The support barrel 150 is thus mounted in a load bearing relationship between the closure member 60 and the first retainer part 92. The first retainer part 92, in turn, transmits the storage pressure force through the second retainer part 94 to the end cap 50.

Upon receipt of an electric signal from the sensor 24, the initiator 70 is actuated in a known manner to produce a shock wave and combustion products. The shock wave and combustion products flow through the interior of the support barrel 150 into engagement with the closure member 60 and rupture the closure member. Inflation fluid flows through the opening 40 in the container 30 and into the end cap 50. The inflation fluid then flows through the fluid outlet openings 108 in the first retainer part 92 and into the collection chamber 128 of the second retainer part 94. The collection chamber 128 of the second retainer part 94 directs the inflation fluid into the outlet tube 140. The inflation fluid exits the inflator 10 through the outlet tube 140 and thereafter flows to the side curtain 14 to inflate the side curtain. The inflation fluid exits the inflator 10 in a direction parallel to the longitudinal axis 36 of the inflator.

Figure 4:
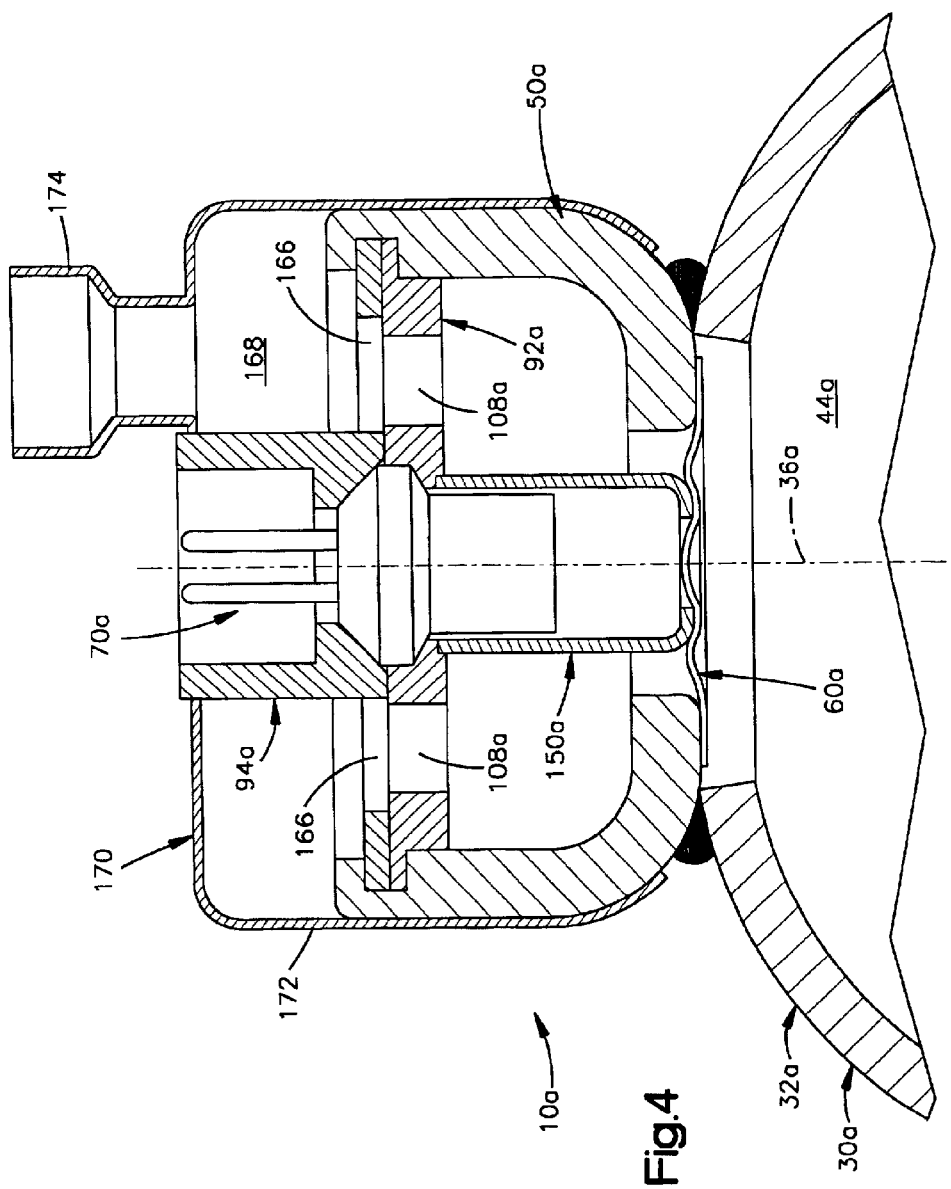
FIG. 4 is a view similar to FIG. 2 showing an inflator in accordance with a second embodiment of the invention.

FIG. 4 illustrates a portion of an inflator 10a constructed in accordance with a second embodiment of the invention. Portions of the inflator 10a that are the same as, or similar to, corresponding portions of the inflator 10 are given the same reference numerals with the suffix "a" attached.

Figure 3:
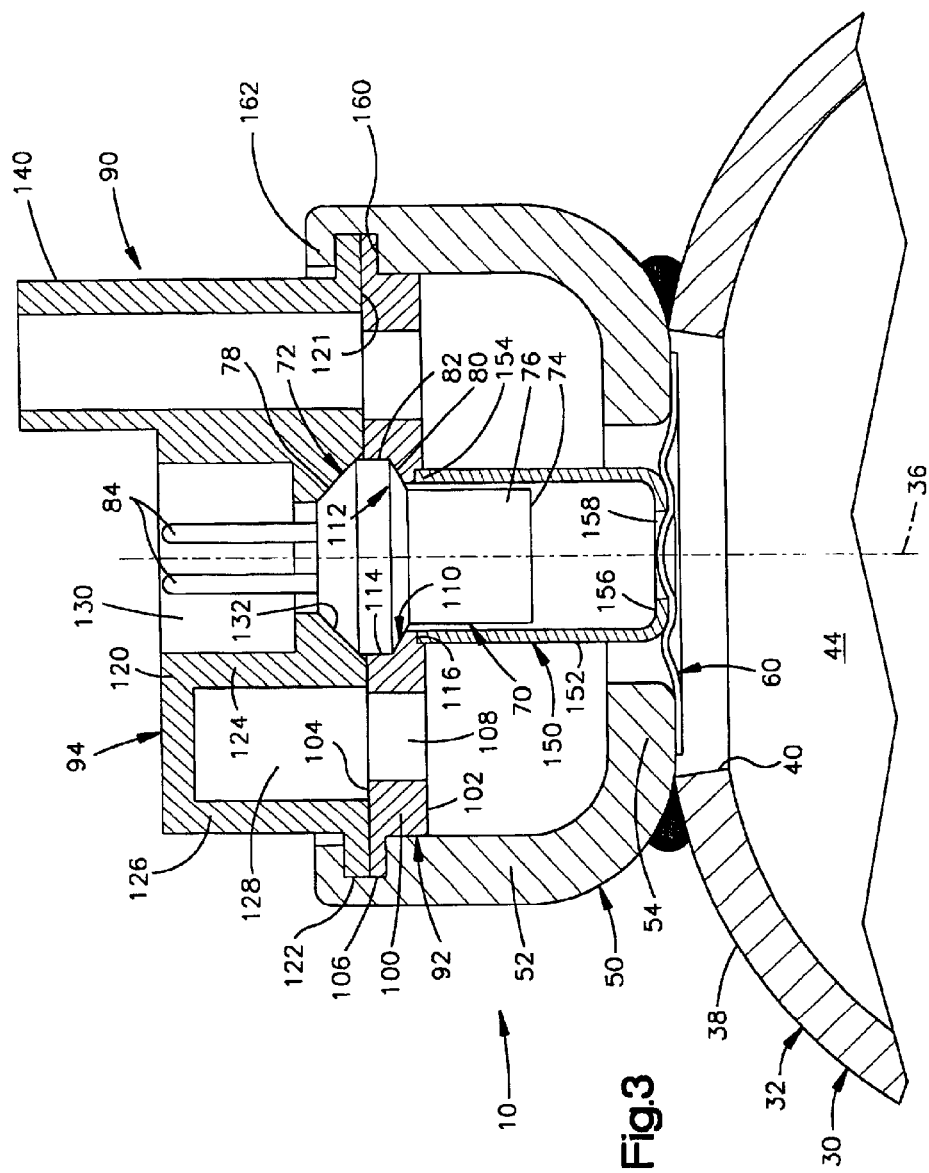
FIG. 3 is a further enlarged view of a portion of the inflator of FIG. 2.

In the inflator 10a, an initiator 70a is clamped between first and second retainer parts 92a and 94a. The second retainer part 94a does not include a fluid outlet tube, like the fluid outlet tube 140 (FIG. 3). Instead, the second retainer part 94a (FIG. 4) has a plurality of fluid outlet openings 166 that are aligned with fluid outlet openings 108a in the first retainer part 92a. The fluid outlet openings 166 in the second retainer part 94a open into a chamber 168 in a diffuser 170.

The diffuser 170 is a tubular member, preferably made from sheet metal, that is crimped onto the end cap 50a. The diffuser 170 has a relatively wide collection portion 172 that extends around the retainer 90a and the initiator 70a. An outlet tube 174 extends from the collection portion 172.

Operation of the inflator 10a is similar to operation of the inflator 10. When the initiator 70a is actuated, the combustion products of the initiator are directed through the support barrel 150a into engagement with the closure member 60a. The closure member 60a ruptures, enabling inflation fluid to flow into the end cap 50a, through the aligned openings 108a and 166 in the retainer parts 92a and 94, into the chamber 168 of the diffuser 170. The inflation fluid flows out of the inflator 10a through the outlet tube 174 of the diffuser 170, in a direction parallel to the longitudinal axis 36a of the inflator.

Figure 5:
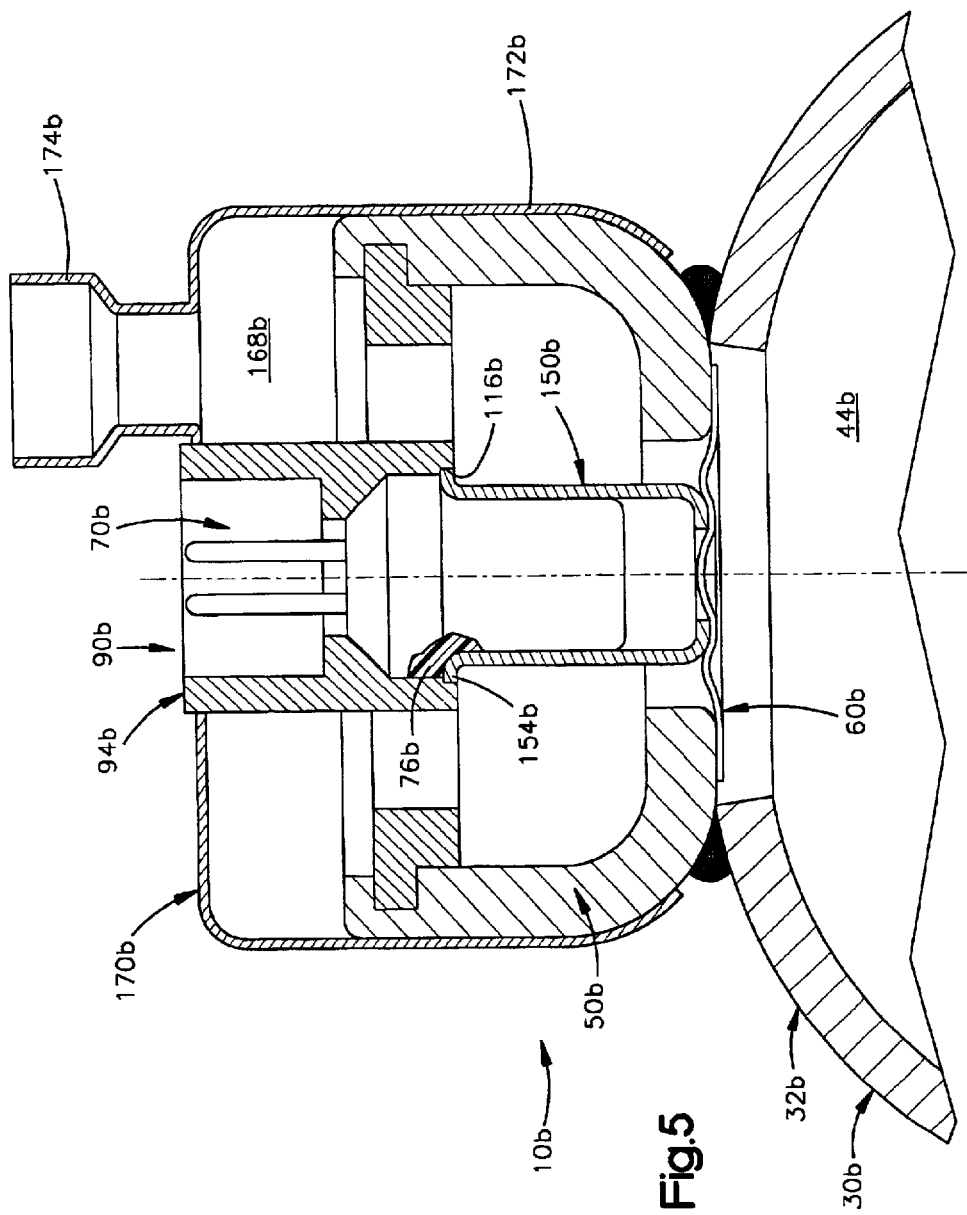
FIG. 5 is a view similar to FIG. 2 showing an inflator in accordance with a third embodiment of the invention.

FIG. 5 illustrates a portion of an inflator 10b constructed in accordance with a third embodiment of the invention. Portions of the inflator 10b that are the same as, or similar to, corresponding portions of the inflator 10 are given the same reference numerals with the suffix "b" attached.

The inflator 10b includes a retainer 90b. The retainer 90b comprises a first retainer part in the form of a support barrel 150b, and a second retainer part 94b. The second retainer part 94b has a configuration similar to that of the second retainer part 94a of the inflator 10a (FIG. 4). The second retainer part 94b (FIG. 5) supports an initiator 70b having a deformable plastic covering 76b.

The second retainer part 94b has an annular notch 116b that is presented toward the closure member 60b. The notch 116b receives a flared end portion 154b of a support barrel 150b. The end portion 154b of the support barrel 150b also engages the plastic covering 76b of the initiator 70b. The dimensions of the support barrel 150b, initiator 70b, and second retainer part 94b are selected so that, in assembly of the inflator 10b, the support barrel initially presses against only the initiator, and not the second retainer part, until the fluid force on the closure member 60b loads the support barrel 150b. As a result, the flared end portion 154 of the support barrel 150b effects a fluid tight-seal against the initiator 70b.

Figure 6:
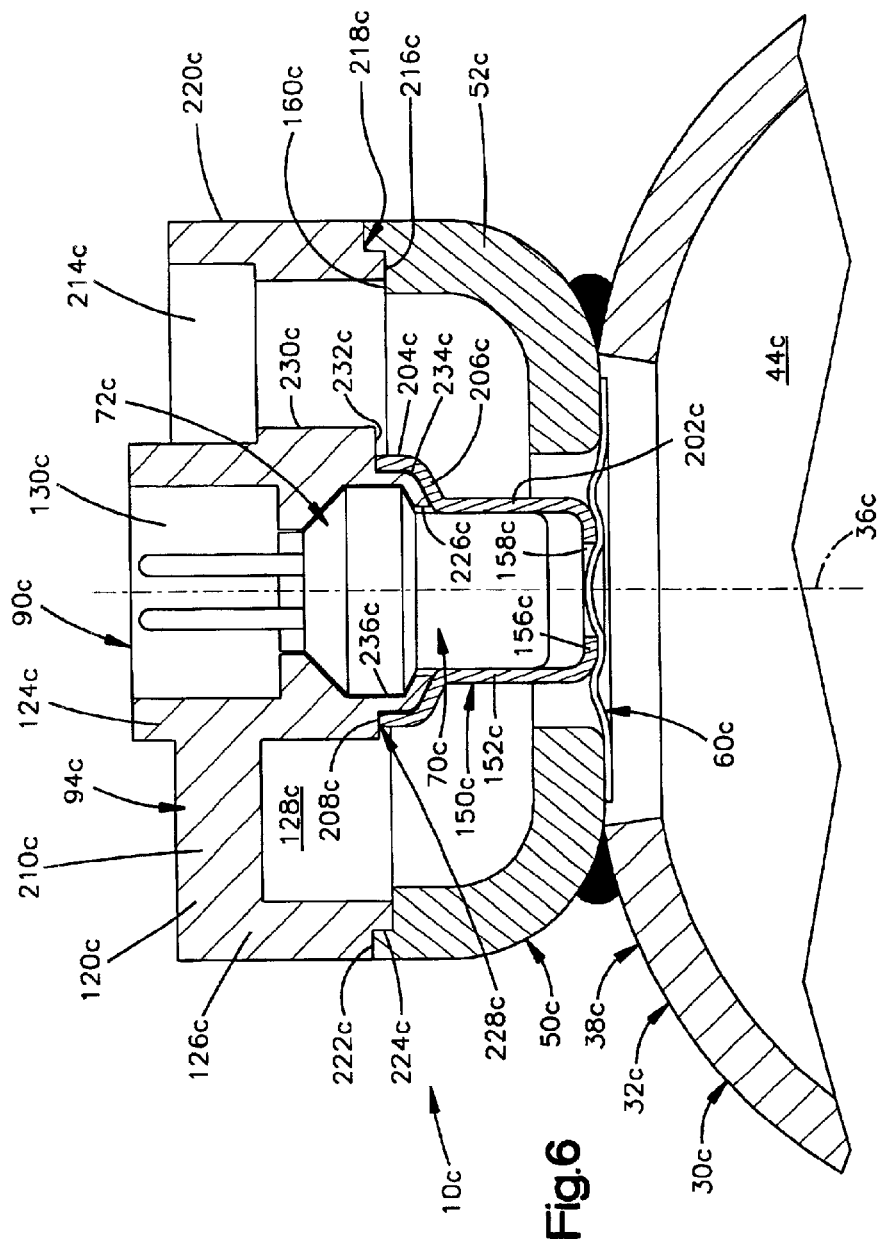
FIG. 6 is a view similar to FIG. 2 showing an inflator in accordance with a fourth embodiment of the invention.

FIG. 6 illustrates a portion of an inflator 10c constructed in accordance with a fourth embodiment of the invention. Portions of the inflator 10c that are the same as, or similar to, corresponding portions of the inflator 10 are given the same reference numerals with the suffix "c" attached. Portions of the inflator 10c that were not introduced with reference numerals in discussing the inflator 10 will have values in the two hundreds with the suffix "c" attached.

The inflator 10c includes a retainer 90c. The retainer 90c comprises a first retainer part in the form of a support barrel 150c, and a second retainer part 94c. The support barrel 150c has a side wall 152c and an end wall 156c. The side wall 152c includes a first cylindrical portion 202c, a second cylindrical portion 204c, and a frustoconical portion 206c that connects the first and second cylindrical portions. The first cylindrical portion 202c has a diameter that is less than a diameter of the second cylindrical portion 204c. The end wall 156c closes one end of the first cylindrical portion 202c. An opening 158c extends through the central portion of the end wall 156c. A second end of the first cylindrical portion 202c connects to a narrow end of the frustoconical portion 206c. The second cylindrical portion 204c extends from a wide end of the frustoconical portion 206c. The second cylindrical portion 204c terminates at an annular end surface 208c.

The second retainer part 94c has a cylindrical main body portion 120c. The main body portion 120c includes cylindrical inner and outer walls 124c and 126c. The inner and outer walls 124c and 126c define between them an annular collection chamber 128c. An end wall 210c extends between the inner and outer walls 124c and 126c on a first end of the second retainer part 94c. An opening in the end wall 210c forms a gas outlet 214c. The gas outlet 214c is in fluid communication with the collection chamber 128c. Fluid flowing from the collection chamber 128c through the gas outlet 214c flows in a direction parallel to the longitudinal axis 36c.

The outer wall 126c terminates at an annular end surface 216c, opposite the end wall 210c. An annular notch 218c extends between the end surface 216c and a radially outer surface 220c of the outer wall 126c. A radial notch surface 222c and an axial notch surface 224c define the annular notch 218c.

The inner wall 124c defines a chamber 130c for receiving a portion of the initiator 70c. The chamber 130c is located radially inwardly of the inner wall 124c. The inner wall 124c terminates at an annular end surface 226c, opposite the end wall 210c. An annular notch 228c extends between the end surface 226c and a radially outer surface 230c of the inner wall 124c. A radial notch surface 232c and an axial notch surface 234c define the annular notch 228c. A portion of the inner wall 124c between the axial notch surface 234c and a radially inner surface 236c of the inner wall 124c is bendable.

To assemble the inflator 10c, the support portion 72c of the initiator 70c is positioned in the chamber 130c. The support portion 72c of the initiator 70c has a plastic outer covering. The portion of the inner wall 124c between the axial notch surface 234c and the radially inner surface 236c is crimped around the support portion 72c of the inflator 70c. This engagement of the second retainer part 94c with the initiator 70c creates a fluid-tight seal between the initiator and the retainer 90c.

The second cylindrical portion 204c of the support barrel 150c is then positioned around the crimped portion of the inner wall 124c. When the support barrel 150c is properly positioned relative to the second retainer part 94c, the annular end surface 208c of the second cylindrical portion 204c of the support barrel contacts the radial notch surface 232c of the inner wall 124c of the second retainer part 94c. The second cylindrical portion 204c of the support barrel 150c also abuts the axial notch surface 234c of the inner wall 124c of the second retainer part 94c. The abutment of the second cylindrical portion 204c of the support barrel 150c with the axial notch surface 234c of the inner wall 124c of the second retainer part 94c holds the support barrel in place, relative to the second retainer part, during assembly of the inflator 10c.

Next, the second retainer part 94c is positioned on the end cap 50c of the inflator 10c such that the end surface 216c of the outer wall 126c contacts the stop surface 160c on the side wall 52c of the end cap 50c. The second retainer part 94c is then laser welded to the end cap 50c. During the subsequent loading of the closure member 60c by the pressure of inflation fluid introduced into the chamber 44c, the closure member deforms and contacts the end wall 156c of the support barrel 150c.

Operation of the inflator 10c of FIG. 6 is similar to operation of inflator 10. When the initiator 70c is actuated, the combustion products of the initiator are directed through the support barrel 150c into engagement with the closure member 60c. The closure member 60c ruptures, enabling inflation fluid to flow into the end cap 50c. The inflation fluid flows from the end cap 50c into the chamber 128c of the second retainer part 94c. The inflation fluid then flows out of the inflator 10c through the gas outlet 214c, in a direction parallel to the longitudinal axis 36c of the inflator 10c.

Figure 7:
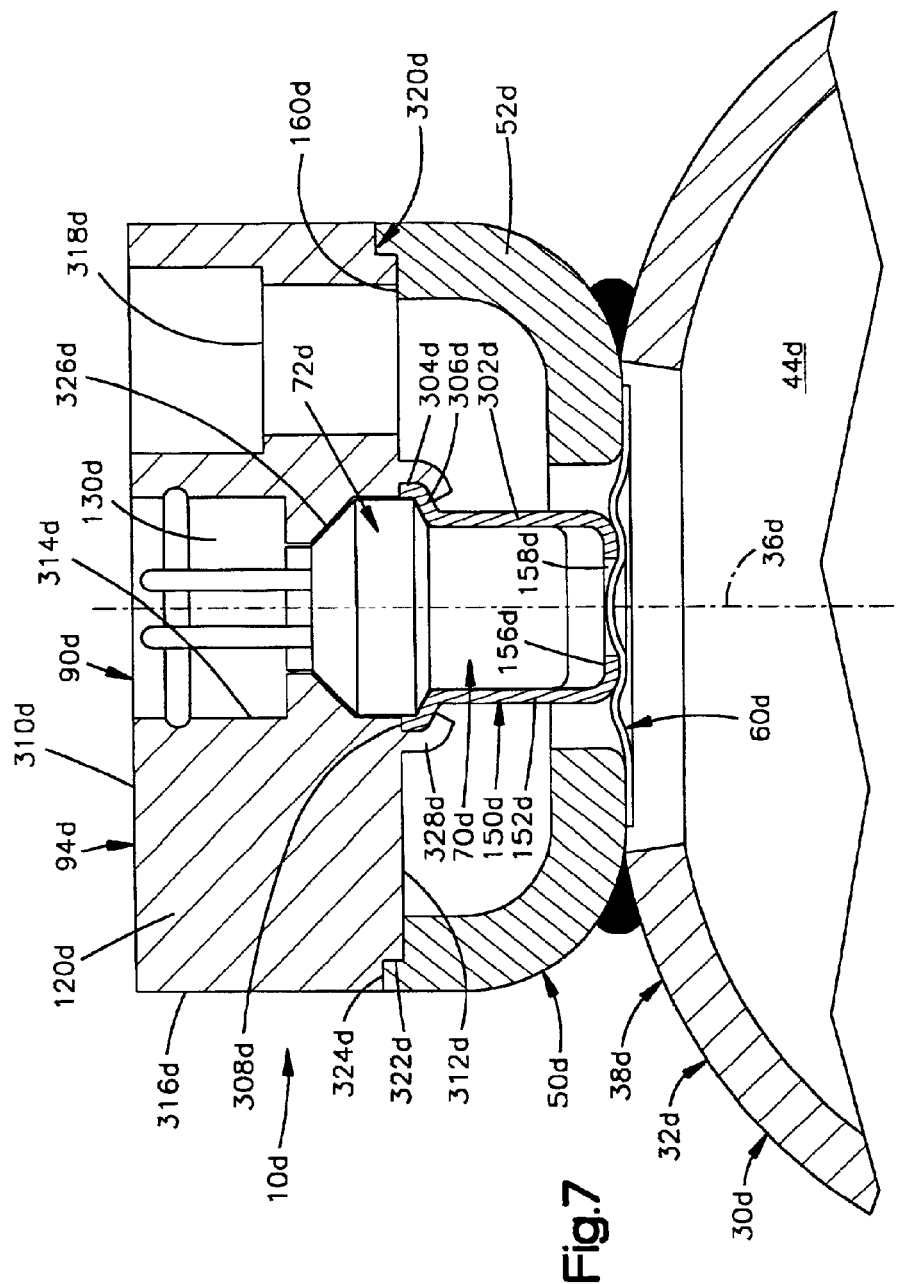
FIG. 7 is a view similar to FIG. 2 showing an inflator in accordance with a fifth embodiment of the invention.

FIG. 7 illustrates a portion of an inflator 10d constructed in accordance with a fifth embodiment of the invention. Portions of the inflator 10d that are the same as, or similar to, corresponding portions of the inflator 10 are given the same reference numerals with the suffix "d" attached. Portions of the inflator 10d that were not introduced with reference numerals in discussing the inflator 10 will have values in the three hundreds with the suffix "d" attached.

The inflator 10d includes a retainer 90d. The retainer 90d comprises a first retainer part in the form of a support barrel 150d, and a second retainer part 94d. The support barrel 150d has a side wall 152d and an end wall 156d. The side wall 152d includes a first cylindrical portion 302d, a second cylindrical portion 304d, and a frustoconical portion 306d that connects the first and second cylindrical portions. The first cylindrical portion 302d has a diameter that is less than a diameter of the second cylindrical portion 304d. The end wall 156d closes one end of the first cylindrical portion 302d. An opening 158d extends through a central portion of the end wall 156d. A second end of the first cylindrical portion 302d connects to a narrow end of the frustoconical portion 306d. The second cylindrical portion 304d extends from a wide end of the frustoconical portion 306d. The second cylindrical portion 304d terminates at an annular end surface 308d.

The second retainer part 94d has a cylindrical main body portion 120b. The main body portion 120d includes first and second axial end surfaces 310d and 312d, respectively, and radially inner and outer surfaces 314d and 316d, respectively. A gas outlet 318d extends from the second axial end surface 312d to the first axial end surface 310d through the second retainer part 94d between the radially inner and outer surfaces 314d and 316d. Fluid flowing through the gas outlet 318d flows in a direction parallel to the longitudinal axis 36d.

An annular notch 320d is formed on the second axial end surface 312d at a union with the radially outer surface 316d. The annular notch 320d is defined by an axial notch surface 322d and a radial notch surface 324d. The radially inner surface 314d of the second retainer part 94d defines a chamber 130d for receiving a portion of an initiator 70d. The chamber 130d narrows as it extends axially away from the second end surface 312d of the second retainer part 94d. The narrowing of the chamber 130d is the result of a frustoconical portion 326d of the inner surface 314d, which projects radially inward. An annular projection 328d projects axially outwardly of the second axial end surface 312d of the second retainer part 94d.

To assemble the inflator 10d, the support portion 72d of the initiator 70d is positioned in the chamber 130d adjacent the frustoconical portion 326d of the radially inner surface 314d of the second retainer part 94d. The support portion 72d of the initiator 70d has a plastic outer covering. The second cylindrical portion 304d of the support barrel 150d is then positioned within the projection 328d of the second retainer part 94d. When the support barrel 150d is properly positioned, the support portion 72d of the initiator 70d is clamped between the frustoconical portion 306d of the support barrel 150d and the frustoconical portion 326d of the inner surface 314d of the second retainer part 94d. The annular projection 328d is then crimped around the frustoconical portion 306d of the support barrel 150d to secure the support barrel 150d to the second retainer part 94d. This engagement of the second retainer part 94d with the initiator 70d creates a fluid-tight seal between the initiator and the retainer 90d.

Next, the second retainer part 94b is positioned on the end cap 50d of the inflator 10d such that the second axial end surface 312d contacts the stop surface 160d on the side wall 52d of the end cap 50d. The second retainer part 94d is then laser welded to the end cap 50d. During the subsequent loading of the closure member 60d by the pressure of inflation fluid introduced into the chamber 44d, the closure member deforms and contacts the end wall 156d of the support barrel 150d.

Operation of the inflator 10d of FIG. 7 is similar to operation of inflator 10. When the initiator 70d is actuated, the combustion products of the initiator are directed through the support barrel 150d into engagement with the closure member 60d. The closure member 60d ruptures, enabling inflation fluid to flow into the end cap 50d. The inflation then flows out of the inflator 10d through the gas outlet 318d, in a direction parallel to the longitudinal axis 36d of the inflator.

From the above description of the invention, those skilled in the art may perceive improvements, changes and modifications in the invention. For example, although the inflator 10 is shown being used with a side curtain 14, the inflator could be used in any known inflatable vehicle occupant protection device, such as frontal or side impact air bags, inflatable seat belts, inflatable knee bolsters, inflatable air bags to operate knee bolsters, and inflatable head liners. Also, the invention is applicable to inflators that do not use a support member, such as the support barrel 150, to support a rupturable member. Such improvements, changes and modifications within the skill of the art are intended to be covered by the appended claims.

Having described the invention, I claim:

1. An inflator for inflating an inflatable vehicle occupant protection device, comprising:

a container in which inflation fluid is stored under pressure, said container having an opening through which inflation fluid flows from said container;

a rupturable closure member fixed to said container and blocking flow of inflation fluid through said opening;

an initiator for, when actuated, rupturing said closure member to enable inflation fluid to flow from said container through said opening; and a retainer for retaining said initiator on said container, said retainer comprising first and second parts that are movable relative to each other when said retainer is not connected with said container;

said first and second retainer parts when connected with said container cooperating to clamp said initiator in position on said container;

said first and second retainer parts defining a fluid outlet through which inflation fluid flows from said opening to exit said inflator.

2. An inflator as set forth in claim 1 wherein said first and second retainer parts have aligned fluid outlet openings through which inflation fluid flows.

3. An inflator as set forth in claim 1 wherein said first and second retainer parts have adjacent mounting portions that are secured to said container to hold said retainer in position on said container.

4. An inflator as set forth in claim 1 wherein said first retainer part has a disk-shaped configuration including a central opening for receiving and supporting said initiator and at least one fluid outlet opening.

5. An inflator as set forth in claim 1 further comprising a support for said rupturable closure member, said rupturable closure member having a first portion deformed into engagement with said support by the pressure of said inflation fluid in said container, said support transmitting force from said closure member to said retainer.

6. An inflator as set forth in claim 1 wherein said first retainer part comprises a support for said rupturable closure member, said rupturable closure member having a first portion deformed into engagement with said support by the pressure of said inflation fluid in said container.

7. An inflator as set forth in claim 6 wherein said initiator when actuated generates combustion products and a shock wave that are directed through the interior of said support into engagement with said closure member to rupture said closure member.

8. An inflator as set forth in claim 1 wherein said first retainer part is supported with an interference fit to locate said first retainer part relative to said container, said initiator being supported on said first retainer part, and said second retainer part being self-centering on said initiator.

9. An inflator as set forth in claim 1 wherein said container has a longitudinal axis and said fluid outlet extends parallel to said longitudinal axis of said container.

10. An inflator for inflating an inflatable vehicle occupant protection device, comprising:

a container in which inflation fluid is stored under pressure, said container having an opening through which inflation fluid flows in a given direction from said container;

a rupturable closure member fixed to said container and blocking flow of inflation fluid through said opening;

an initiator for, when actuated, rupturing said closure member to enable inflation fluid to flow from said container through said opening;

a retainer for retaining said initiator on said container, said retainer comprising at least one part having a passage for directing gas flowing from said container toward an outlet of said inflator, said passage having a longitudinal axis, gas flowing from said container passing through said passage of said retainer and passing through said outlet of said inflator in said given direction, said given direction being parallel to said longitudinal axis of said passage; and a support for said rupturable closure member, said rupturable closure member having a first portion deformed into engagement with said support by the pressure of said inflation fluid in said container, said support transmitting force from said closure member to said retainer.

11. The inflator as set forth in claim 10 wherein the given direction is a direction parallel to a longitudinal axis of the inflator.

12. The inflator as set forth in claim 10 wherein the retainer includes a portion that may be crimped to retain the initiator in the retainer.

13. An inflator for inflating an inflatable vehicle occupant protection device, comprising:

a container in which inflation fluid is stored under pressure, said container having an opening through which inflation fluid flows in a given direction from said container;

a rupturable closure member fixed to said container and blocking flow of inflation fluid through said opening;

an initiator for, when actuated, rupturing said closure member to enable inflation fluid to flow from said container through said opening;

a retainer for retaining said initiator on said container, said retainer comprising at least one part having a passage for directing gas that flows from said container in said given direction; and a support for said rupturable closure member, said rupturable closure member having a first portion deformed into engagement with said support by the pressure of said inflation fluid in said container, said support transmitting force from said closure member to said retainer, wherein the initiator has a support portion having a deformable covering, the initiator being clamped in the retainer so that the deformable covering is deformed and a fluid-tight seal is formed.

14. The apparatus recited in claim 13, wherein the support forms a first retainer part, the support being positioned relative to a second retainer part to clamp the support portion of the initiator between the support and the second retainer part.

15. An inflator for inflating an inflatable vehicle occupant protection device, comprising:

a container in which inflation fluid is stored under pressure, said container having an opening through which inflation fluid flows in a given direction from said container;

a rupturable closure member fixed to said container and blocking flow of inflation fluid through said opening;

an initiator for, when actuated, rupturing said closure member to enable inflation fluid to flow from said container through said opening, said initiator having a support portion with a deformable covering;

a retainer for retaining said initiator on said container, said retainer comprising at least one part having a passage for directing gas that flows from said container in said given direction; and a support for said rupturable closure member, said rupturable closure member having a first portion deformed into engagement with said support by the pressure of said inflation fluid in said container, said support transmitting force from said closure member to said retainer, wherein the support has a portion that engages and deforms the deformable covering to help form a fluid-tight seal.

16. An inflator for inflating an inflatable vehicle occupant protection device, comprising:

a container in which inflation fluid is stored under pressure, said container having an opening through which inflation fluid flows in a given direction from said container;

a rupturable closure member fixed to said container and blocking flow of inflation fluid through said opening;

an initiator for, when actuated, rupturing said closure member to enable inflation fluid to flow from said container through said opening;

a retainer for retaining said initiator on said container, said retainer comprising at least one part having a passage for directing gas that flows from said container in said given direction; and a support for said rupturable closure member, said rupturable closure member having a first portion deformed into engagement with said support by the pressure of said inflation fluid in said container, said support transmitting force from said closure member to said retainer, where the retainer includes a portion that may be crimped against the initiator to retain the initiator in the retainer, the support contacting a portion of the initiator and the crimped portion of the retainer holding the support against the retainer.

* * * * *